US005546749A

United States Patent [19]

[11] Patent Number: 5,546,749

[45] Date of Patent: Aug. 20, 1996

Couchee

[54] NAIL GUN HANDLE EXTENSION

[76] Inventor: Kent Couchee, 291 Penn Way, Los Gatos, Calif. 95032

[21] Appl. No.: 406,066

[22] Filed: Mar. 17, 1995

[51] Int. Cl.$^6$ .............................. F16D 31/02; A47L 11/12

[52] U.S. Cl. ............................ 60/370; 60/407; 16/111 R; 81/57.44; 173/170

[58] Field of Search ................... 60/370, 407; 16/114 R, 16/111 R; 81/57.44; 173/168, 169, 170

[56] References Cited

U.S. PATENT DOCUMENTS

| | | | |
|---|---|---|---|
| 2,815,004 | 12/1957 | Droman | 173/168 |
| 3,949,817 | 4/1976 | Rice | 16/114 R X |
| 3,970,110 | 7/1976 | Schaedler et al. | 173/169 X |
| 4,010,819 | 3/1977 | Ekstrom et al. | 173/168 X |
| 4,197,764 | 4/1980 | Auernhammer | 16/114 R X |
| 4,359,822 | 11/1982 | Kolodziejczyk | 173/170 X |
| 5,353,465 | 10/1994 | Pierce et al. | 173/170 X |
| 5,361,851 | 11/1994 | Fox | 173/170 |

*Primary Examiner*—Edward K. Look
*Assistant Examiner*—Hoang Nguyen
*Attorney, Agent, or Firm*—Keith Kline

[57] ABSTRACT

A handle extension for an air powered tool. The extension has been designed for use with a nail gun, but the mechanism is suitable for any air powered hand tool. The device includes a jointed, tubular extension that is affixed to the tool. The device further includes a trigger mechanism that controls the operation of the tool, and a grip to allow the user to more easily support the weight of the tool.

7 Claims, 5 Drawing Sheets

NAIL GUN HANDLE EXTENSION

FIELD OF THE INVENTION

The present invention relates generally to air powered hand tools, and more particularly is a handle extension device.

BACKGROUND OF THE INVENTION

Air powered hand tools greatly increase the efficiency of many construction operations. A worker is able to accomplish far more in a given time with a power tool than with a tool driven solely by the worker.

One of the great advances in the construction industry was the advent of the air powered nail gun. This enables framers, roofers, floor installers, and others to work far more rapidly.

One drawback to the standard nail gun is that the user must be within arm's reach of his work. While this is not a great inconvenience for single level work, anyone who has carried a nail gun up and down a ladder repeatedly to perform work that cannot be reached from the ground understands that the proximity of the work required is indeed a shortcoming of the prior art.

OBJECTS, SUMMARY, AND ADVANTAGES OF THE INVENTION

Accordingly, it is an object of the present invention to provide a means for a worker to reach high places without the use of a ladder.

It is a further object of the present invention to provide a means whereby the user can remotely trigger an air powered tool.

In summary, the present invention is a handle extension for an air powered tool. The device has been designed for use with a nail gun, but the mechanism is suitable for any air powered hand tool. The device includes a jointed, tubular extension that is affixed to the tool. The device further includes a trigger mechanism that controls the operation of the tool, and a grip to allow the user to more easily support the weight of the tool.

An advantage of the present invention is that the user is able to reach workplaces with the tool that he could not reach by hand. This can save a tremendous amount of time in situations where use of a ladder would ordinarily be required.

Another advantage of the present invention is that it is lightweight, making it easy for the user to support.

A still further advantage of the present invention is that it is simple and economical to manufacture.

These and other objects and advantages of the present invention will become apparent to those skilled in the art in view of the description of the best presently known mode of carrying out the invention as described herein and as illustrated in the drawings.

BEST MODE OF CARRYING OUT THE INVENTION

Figure 1:
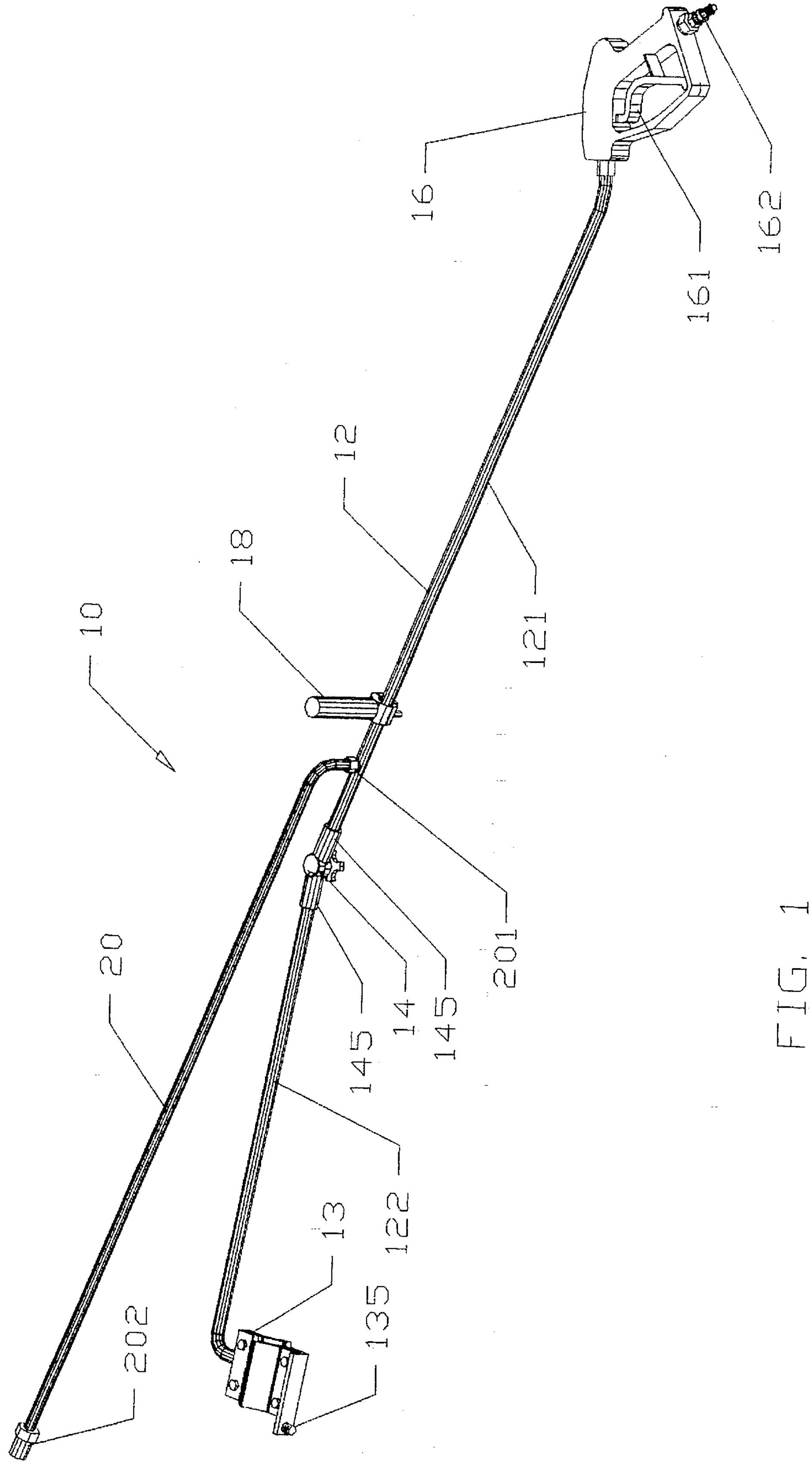
FIG. 1 is a perspective view of the handle extension of the present invention.

The present invention is a tool handle extension 10. Referring now chiefly to FIG. 1, the extension 10 comprises a rigid extending element 12 which is made from metal tubing. It has been determined by the inventor that aluminum tubing in the range of 0.083"–0.120" is appropriate to minimize weight while giving proper support to the tool.

The extending element 12 includes a lower segment 121 and an upper segment 122. A terminal end of the upper segment 122 is bent to a 90° angle to receive a tool holding means 13.

Figure 5:
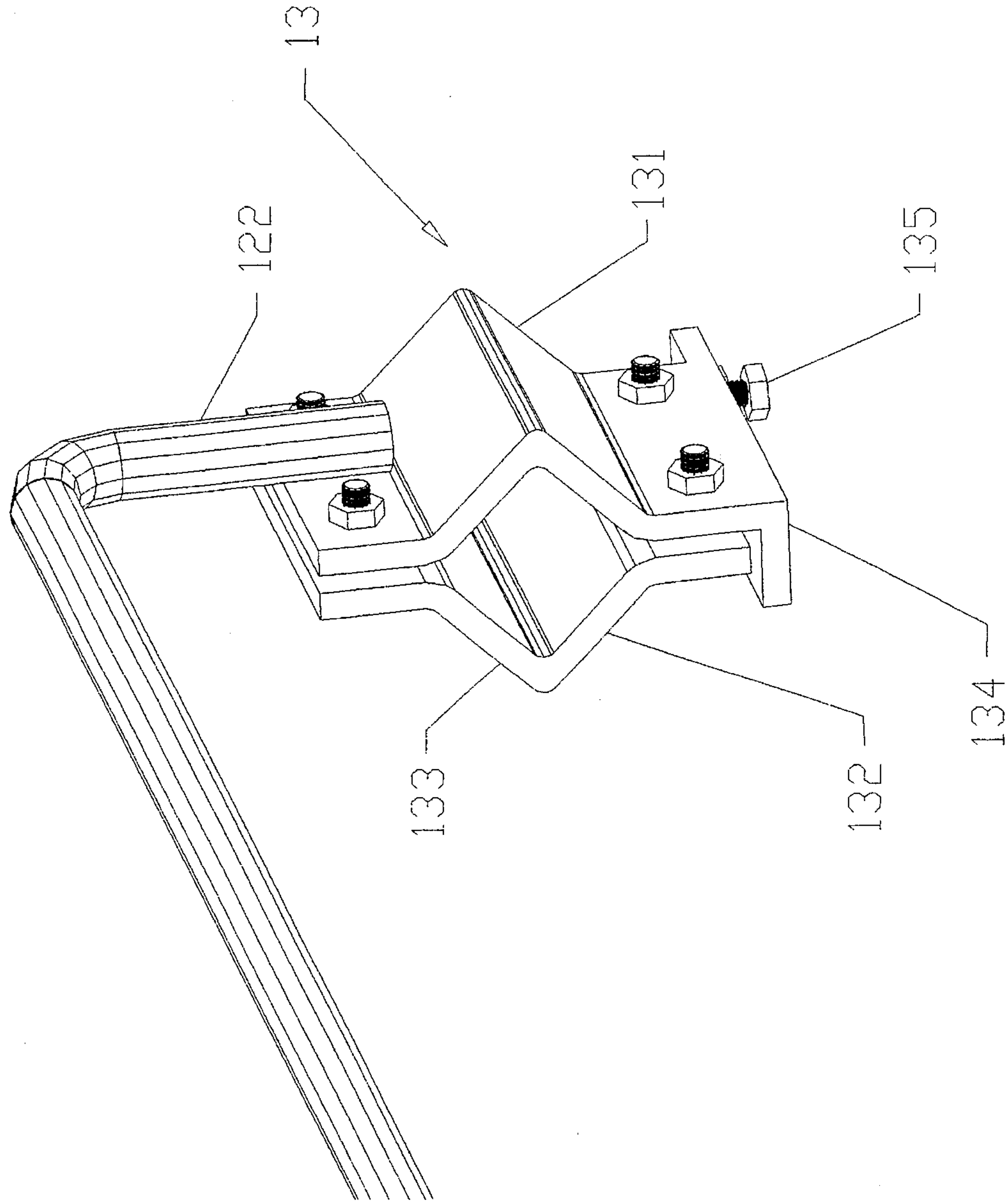
FIG. 5 is a detailed perspective view of the tool holding means.

The tool holding means 13, (shown in detail in FIG. 5), is adapted to receive the handle of the subject tool, and in particular a nail gun. The holding means 13 includes two opposing fixture elements, a first fixture element 131, and a second fixture element 132. Each of the fixture elements 131, 132 includes a convex central portion so that a tool receiving area 133 is formed when the elements 131, 132 are clamped together.

The first fixture element 131 is affixed to the terminal end of the upper segment 122 of the extending element 12. The second fixture element 132 is held against the first 131 by adjustable securing means. In the preferred embodiment, these means are four bolts. Since the distance between the fixture elements 131 and 132 can be adjusted, thus varying the size of the tool receiving area 133, the tool holding means can accommodate various types and brands of tools. A support plate 134 extends from a lower end of the first fixture element 131 at a 90° angle to provide support for the subject tool.

A trigger lock 135 is provided on the first fixture element 131. The trigger lock 135 is used to lock the trigger of the nail gun in an on position. This enables the user to activate the gun or other tool by use of the trigger mechanism 16.

Figure 4:
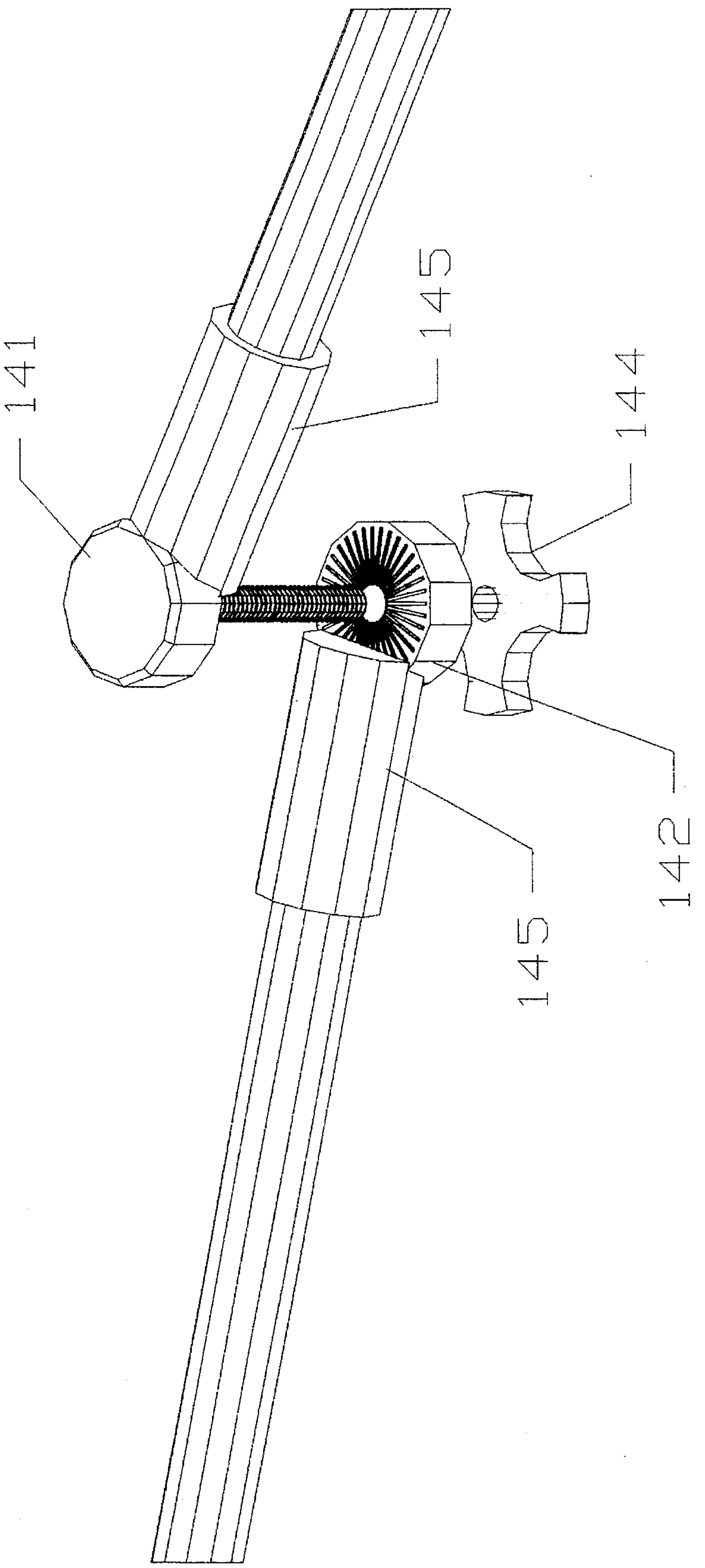
FIG. 4 is an exploded view of the joint.

The two segments 121, 122 of the extension element 12 are connected by a movable joint 14 (shown in detail in FIG. 4) which enables a user to adjust the angle of the extension 10 to any comfortable angle. The joint 14 includes a first plate 141, and a second, opposing plate 142. The plates 141, 142 each include raised teeth which mesh with those of the opposing plate to hold the joint 14 in a fixed position.

A locking means is used to secure and release the joint 14. In the preferred embodiment, the locking means is a wing nut 144 which threads onto a bolt projection 145 integral to the first plate 141.

To fix the angle of the extension element 12, the wing nut 144 is tightened down, thus causing the teeth to mesh, thereby locking the joint in position. To adjust the angle, the wing nut 144 is simply loosened until the two sets of teeth 142 separate, thus allowing the two opposing plates 141, 142 of the joint 14 to rotate independently.

The plates 141, 142 each include coupling means 145 to receive segments of the extending element 12.

Figure 2:
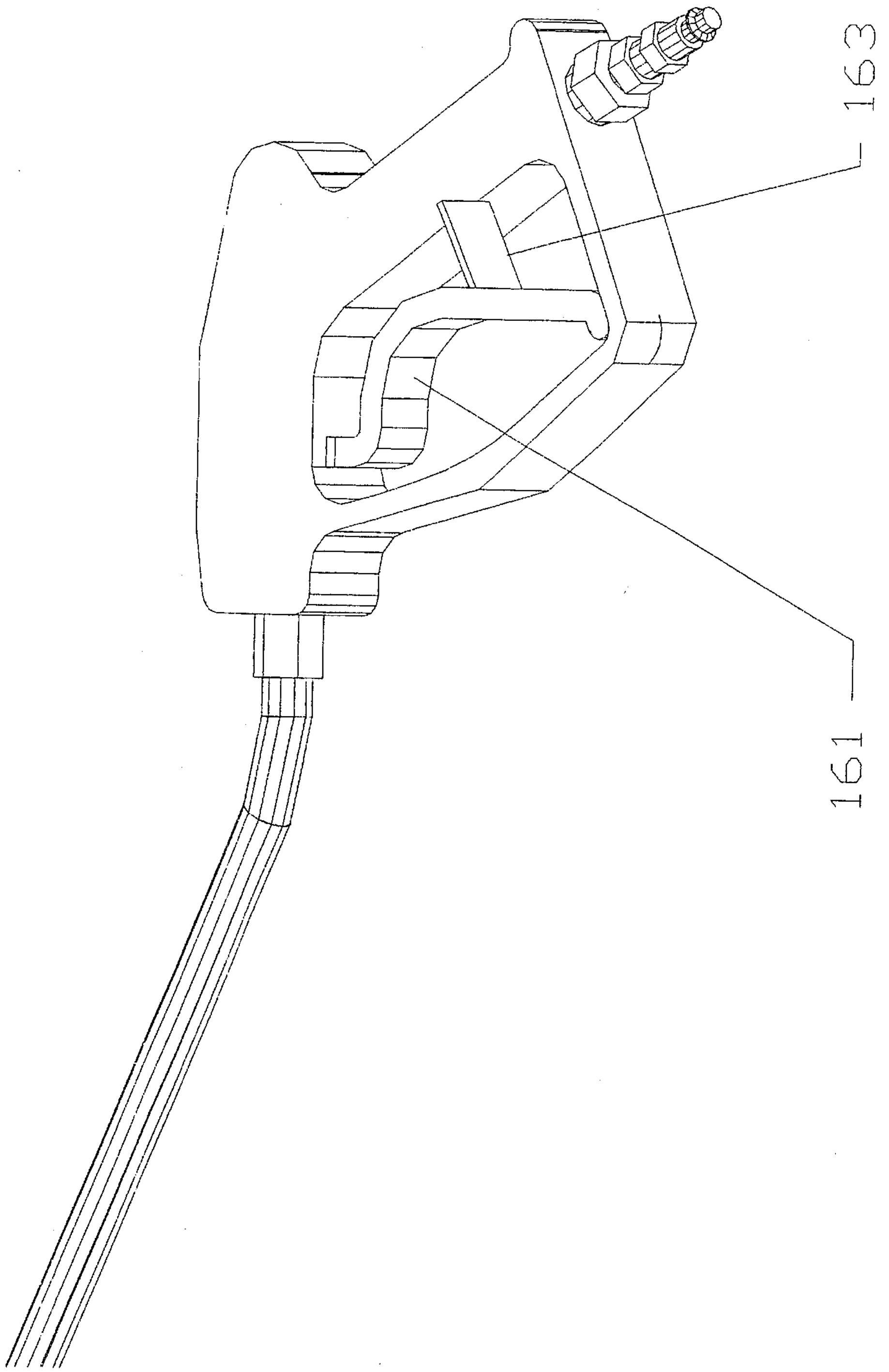
FIG. 2 is a detailed perspective view of the trigger mechanism of the present invention.
Figure 3:
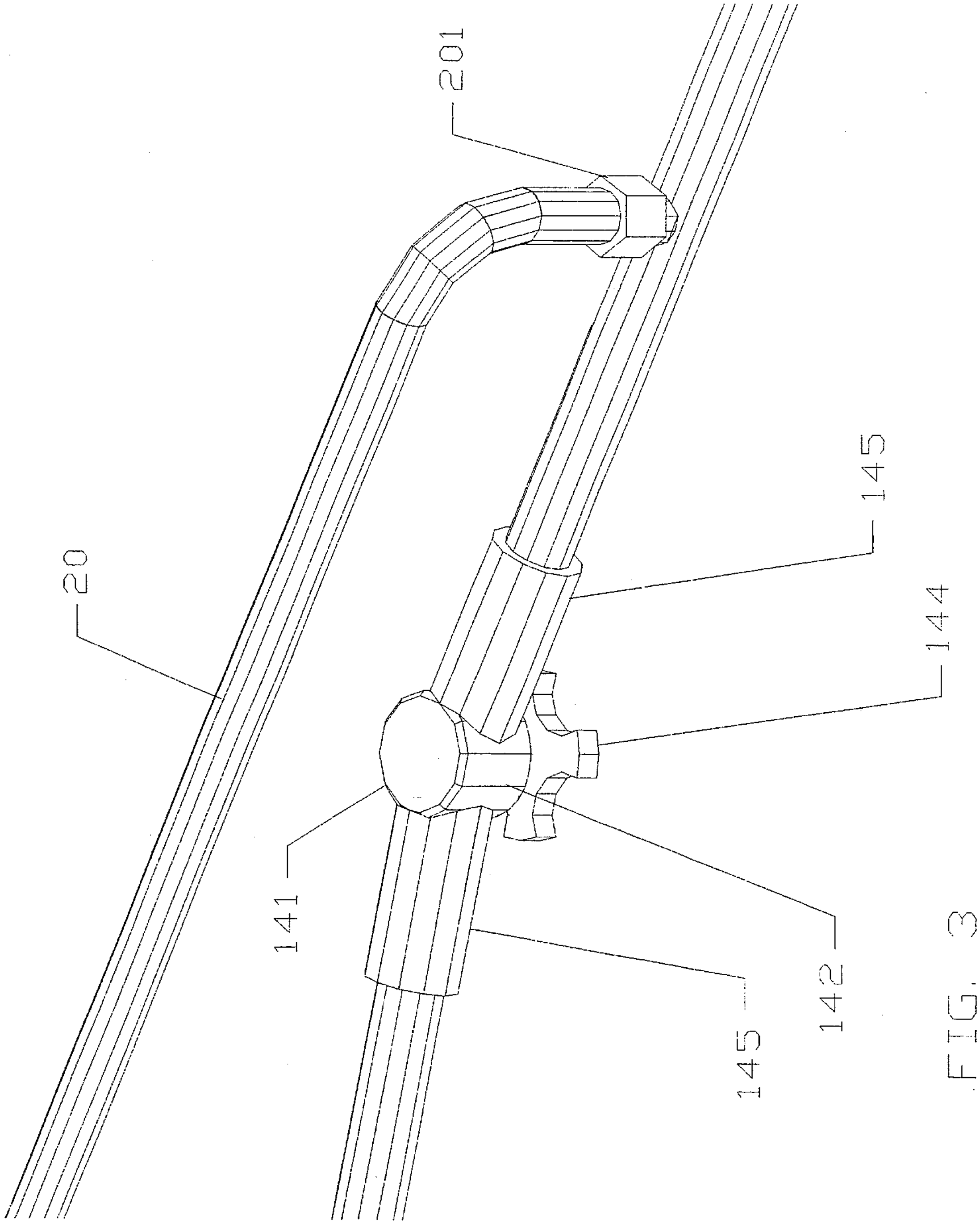
FIG. 3 is a perspective view of the joint and tool air line connection means.

Affixed to a first end of the extending element 12 is a trigger mechanism 16 (shown in detail in FIG. 2). The trigger mechanism 16 includes a trigger 161 and an air inlet fitting 162. The air inlet fitting 162 is affixed to an external air supply. Air flows into the device when the trigger 161 is squeezed by the user. A safety lock 163 which is included in a handle 16 of the trigger mechanism 16 ensures that the device cannot be accidentally triggered. The user must disable the safety lock 163 before the trigger 161 can be depressed. (The trigger mechanism is a commercially available device, and its construction is thus not discussed in detail here.)

A grip 18 is slidably mounted on the extension element 12. The grip is mounted slidably so that the user can adjust its position to his comfort.

A tool air supply line 20 is tapped into the extension element 12 at some point beneath the joint 14. The tool air supply line 20 will most often be made from flexible rubber hose. The tool air inlet line 20 includes a tap fitting 201 and a tool outlet fitting 202. When the tool is affixed to the fitting 202, an airway between the air inlet 162 and the tool is completed.

Operation of the device is as follows: An air line is affixed to the air inlet fitting to supply power. The user adjusts the angle of the extension element 12 by adjusting the joint 14. The angle is chosen according to the user's comfort and the conditions of the job at hand. The nail gun or other tool is secured in the tool holding means 13. The tool outlet fitting is applied to the air fitting on the tool, and the trigger of the tool is fixed in the on position by use of the trigger lock 135.

The user is then able to operate the nail gun as per usual, with the benefit of being able to reach far above his head. Generally, the user will place the head of the gun against the work surface, actuating a safety switch in the head of the gun. Then, when the trigger 161 of the device is pulled, a nail will be fired. If the safety switch of the gun has not been activated, i.e. if the trigger is pulled before the gun is in position, the gun will not fire.

The above disclosure is not intended as limiting. Those skilled in the art will readily observe that numerous modifications and alterations of the device may be made while retaining the teachings of the invention. Accordingly, the above disclosure should be construed as limited only by the metes and bounds of the appended claims.

I claim:

1. A handle extension for an air powered hand tool comprising:

an extending element, tool holding means, a trigger mechanism, and means to supply driving air to said tool; and wherein said extending element includes an upper segment and a lower segment, the two segments being joined by a joint whose angle is adjustable, said joint includes two opposing plates, each plate including a set of raised teeth on an inner surface thereof, said teeth meshing together to hold said joint at a fixed angle when a locking means of said joint is activated, said joint being released from said fixed angle by a user releasing said locking means, thereby allowing said sets of teeth to disengage.

2. The device of claim 1 wherein:

said locking means is a wing nut threaded onto a bolt which extends from said inner face of said first plate.

3. The device of claim 1 wherein:

said tool holding means includes a tool receiving area that is adjustable in size.

4. The device of claim 3 wherein:

said tool receiving area is formed by a convex central portion of a first fixture element and a convex central portion of a second opposing fixture element.

5. The device of claim 3 wherein:

at least one of the fixture elements includes a support plate.

6. The device of claim 4 wherein:

the size of said tool receiving area is adjusted by tightening and loosening bolts.

7. A handle extension for an air powered hand tool comprising:

an extending element, said extending element includes an upper segment and a lower segment, the two segments being joined by a joint whose angle is adjustable, said joint includes two opposing plates, each plate including a set of raised teeth on an inner surface thereof, said teeth meshing together to hold said joint at a fixed angle when a locking means of said joint is activated, said joint being released from said fixed angle by a user releasing said locking means, thereby allowing said sets of teeth to disengage, tool holding means, said tool holding means includes a tool receiving area that is adjustable in size, said tool receiving area is formed by a convex central portion of a first fixture element and a convex central portion of a second fixture element.

* * * * *